(12) United States Patent
Suwabe et al.

(10) Patent No.: US 6,890,616 B2
(45) Date of Patent: May 10, 2005

(54) CERAMIC HONEYCOMB FILTER AND ITS STRUCTURE

(75) Inventors: Hirohisa Suwabe, Fukuoka-ken (JP);
Shunji Okazaki, Fukuoka-ken (JP);
Osamu Tokudome, Tochigi-ken (JP);
Yasuhiko Otsubo, Fukuoka-ken (JP)

(73) Assignee: Hitachi Metals Ltd., Tokyo (JP)

( * ) Notice: Subject to any disclaimer, the term of this patent is extended or adjusted under 35 U.S.C. 154(b) by 0 days.

(21) Appl. No.: 10/307,360

(22) Filed: Dec. 2, 2002

(65) Prior Publication Data

US 2003/0165662 A1 Sep. 4, 2003

(30) Foreign Application Priority Data

Dec. 3, 2001 (JP) ...................................... 2001-368807
Dec. 27, 2001 (JP) ...................................... 2001-395759
Mar. 13, 2002 (JP) ...................................... 2002-068189

(51) Int. Cl.$^7$ .............................................. B32B 3/12
(52) U.S. Cl. ................ 428/117; 428/314.2; 428/316.6; 428/304.4; 422/177; 422/180; 422/211; 422/222; 55/523; 502/407; 502/414; 502/415
(58) Field of Search ................................ 428/116, 117, 428/118, 314.2, 316.6, 304.4; 422/129, 168, 177, 180, 211, 222; 55/523; 502/407, 414, 415

(56) References Cited

U.S. PATENT DOCUMENTS

| | | | |
|---|---|---|---|
| 4,233,351 A | 11/1980 | Okumura et al. | |
| 4,329,162 A | 5/1982 | Pitcher, Jr. | |
| 4,632,683 A | 12/1986 | Fukutani et al. | |
| 5,069,697 A | 12/1991 | Hamaguchi et al. | |
| 5,549,725 A | 8/1996 | Kasai et al. | |
| 5,595,581 A | 1/1997 | Ichikawa et al. | |
| 5,720,787 A | 2/1998 | Kasai et al. | |
| 5,753,339 A | 5/1998 | Hawes | |
| 2002/0189217 A1 * | 12/2002 | Ishihara et al. | ............... 55/523 |
| 2003/0153459 A1 * | 8/2003 | Kato et al. | ............. 502/527.19 |

FOREIGN PATENT DOCUMENTS

| | | |
|---|---|---|
| EP | 0 283 220 A1 | 9/1988 |
| EP | 0 354 721 A2 | 2/1990 |
| EP | 0 753 490 A1 | 1/1997 |
| EP | 0 854 123 A1 | 7/1998 |
| EP | 0 867 223 A1 | 9/1998 |
| EP | 1 251 247 A1 | 10/2002 |
| JP | 51-20435 | 6/1976 |
| JP | 54-150406 | 11/1979 |
| JP | 55-147154 | 11/1980 |
| JP | 57-191421 | 12/1982 |

(Continued)

OTHER PUBLICATIONS

Yukihito Ichikawa, et al., Development of Wall–Flow Type Diesel Particulate Filter System with Efficient Reverse Pulse Air Regeneration, SAE 950735 (Preprint from Diesel Exhaust Aftertreatment 1995 (SP–1073), International Congress and Exhibition, Detroit, Michigan, held on Feb. 27–Mar. 2, 1995 by the Engineer Society of Advancing Mobility Land Sea Air and Space).

Primary Examiner—Deborah Jones
Assistant Examiner—Wendy Boss
(74) Attorney, Agent, or Firm—Sughrue Mion, PLLC

(57) ABSTRACT

A ceramic honeycomb filter comprising a ceramic honeycomb structure having porous partition walls defining a plurality of flow paths for flowing an exhaust gas through the porous partition walls to remove particulates from the exhaust gas, wherein one end of each flow path is provided with a sealer, such that sealers of the flow paths in an inlet and an outlet of the ceramic honeycomb structure in a desired pattern; wherein the partition walls have thickness of 0.1–0.5 mm and a porosity of 50–80%; wherein the porosity of the sealers is larger than that of partition walls; and wherein the depth of the sealers is 3–15 mm.

20 Claims, 10 Drawing Sheets

FOREIGN PATENT DOCUMENTS

| | | |
|---|---|---|
| JP | 61-424 A | 1/1986 |
| JP | 61-10917 | 1/1986 |
| JP | 61-62217 | 4/1986 |
| JP | 61-129015 | 6/1986 |
| JP | 61-138812 A | 6/1986 |
| JP | 61-54750 | 11/1986 |
| JP | 62-10422 | 3/1987 |
| JP | 62-18797 B2 | 4/1987 |
| JP | 63-031517 A | 2/1988 |
| JP | 2-52015 B2 | 2/1990 |
| JP | 2-083278 | 3/1990 |
| JP | 2-63020 | 5/1990 |
| JP | 6-86918 A | 3/1994 |
| JP | 6-159050 A | 6/1994 |
| JP | 7-163822 A | 6/1995 |
| JP | 7-332064 | 12/1995 |
| JP | 08-000931 A | 1/1996 |
| JP | 8-281034 | 10/1996 |
| JP | 2--578176 | 11/1996 |
| JP | 9-077573 | 3/1997 |
| JP | 9-276960 A | 10/1997 |
| JP | 11-128639 A | 5/1999 |
| JP | 2000-342920 A | 12/2000 |
| JP | 2001-269585 A | 10/2001 |

* cited by examiner

CERAMIC HONEYCOMB FILTER AND ITS STRUCTURE

FIELD OF THE INVENTION

The present invention relates to a ceramic honeycomb filter for capturing particulates in exhaust gases of automobiles, particularly those from diesel engines, and a ceramic honeycomb structure used therefor.

BACKGROUND OF THE INVENTION

To remove carbon-based particulates from exhaust gases emitted from diesel engines, ceramic honeycomb filters comprising porous ceramic honeycomb structures with both ends alternately sealed are used.

As shown in FIG. 1, a ceramic honeycomb structure 1 is substantially cylindrical (including an elliptic cross section) with partition walls 3 inside an outer wall 2 and a large number of cells (flow paths) 4 encircled thereby. As shown in FIG. 2(b), both ends of the flow paths 4 are alternately sealed by sealers 5a, 5b.

The cleaning an exhaust gas by a honeycomb filter 10 is carried out as shown in FIG. 2(c). The exhaust gas 20a flows into the flow paths 4 of the honeycomb filter 10, passes through pores in the porous partition walls 3, and exits from the adjacent flow paths 4 as shown by 20b. Particulates in the exhaust gas are captured while passing through the pores of the partition walls 3. Particulates 30 are accumulated on an inner surface of each sealer 5 on an exit side. When particulates captured by the partition walls 4 exceed a permitted level, the clogging of the filter 10 occurs. Accordingly, the captured particulates are burned off by a burner or an electric heater to regenerate the filter 10.

Important for such particulates-capturing filter are filter characteristics such as pressure loss, particulates-capturing efficiency, breakage resistance and melting-away resistance, etc. Though the pressure loss can be reduced by increasing the porosity and pore size of partition walls or by decreasing exhaust gas resistance, larger porosity and pore size leads to lower strength in the partition walls, resulting in low breakage resistance of the filter. Further, sealers formed at both ends of the honeycomb filter not only increases the pressure loss, but also lowers the thermal shock resistance. It is thus difficult to satisfy both of the requirements of pressure loss and breakage resistance.

JP 7-332064 A discloses a method for connecting pores three-dimensionally in sealers on the side of discharging an exhaust gas so that its porosity is 110-140% of the porosity of partition walls, to prevent the pressure loss of a ceramic honeycomb filter from being increased by sealers. However, the ceramic honeycomb structure of JP 7-332064 A, as described in its Examples, has as small porosity as 45% and thus large pressure loss of a ceramic honeycomb filter. Because it does not have pores in sealers on an inlet side while it has pores in sealers on an exit side, an exhaust gas cannot pass through the sealers on the inlet side, resulting in insufficient effect of reducing the pressure loss.

JP 8-281034 A discloses that thermal shock at the time of regeneration is concentrated in boundaries between sealed portions and unsealed portions in the partition walls of a honeycomb filter, and that such boundaries (corresponding to seal depth) should not be continuous on a line to prevent the honeycomb filter from being broken by such thermal shock. However, when the seal depth of the honeycomb filter is nonuniform, there is only a small effective area as a filter in portions having large seal depth, resulting in large pressure loss. Also, with the nonuniform seal depth, filter areas differ from product to product, causing the problem that the resultant honeycomb filters do not have constant quality. Further, there is weak adhesion strength between the sealers and the partition walls in portions having small seal depth, the sealers are likely to peel off by the pressure of an exhaust gas or thermal shock, etc.

Usually, a ceramic honeycomb structure has square cells (flow paths) as shown in FIGS. 13(a) and (b), and the thickness of partition walls is substantially uniform throughout the ceramic honeycomb structure. A ceramic honeycomb structure having such structure has high strength in a direction in parallel with the partition walls, but its strength is low in a direction slanting to the partition walls. Accordingly, when used for catalyst converters and particulates-capturing filters, it is likely to suffer from cracking 13 in partition wall intersections by thermal shock or stress as shown in FIG. 6, resulting in breakage in a diagonal direction of cells.

To avoid such problems, JP 55-147154 A discloses a technology of making partition walls near an outer wall thicker than partition walls inside them to increase the strength of the overall ceramic honeycomb structure. However, because the partition walls are not thick in a core portion of the ceramic honeycomb structure, the partition wall intersections have uniform strength, so that cracking generated in the partition wall intersections continuously propagate through the core portion.

JP 51-20435 B discloses that partition wall intersections are arcuately or linearly expanded to prevent that cracking is generated in the partition wall intersections on which stress is concentrated, and that catalytic reaction efficiency decreases in corners of flow paths (facing partition wall intersections) in which an exhaust gas does not flow smoothly. However, because the strength of the partition wall intersections is uniform throughout the ceramic honeycomb structure, cracking generated by thermal shock or stress continuously propagates along the partition wall intersections.

JP 61-129015 A discloses a filter for cleaning an exhaust gas having partition walls whose pores are composed of small pores having a pore diameter of 5–40 $\mu$m and large pores having a pore diameter of 40–100 $\mu$m, the number of the small pores being 5–40 times that of the large pores. Though it does not describe porosity, the porosity is calculated as 43–64% from an accumulated pores volume of 0.3–0.7 cm$^3$/g, assuming that cordierite has a true specific gravity of 2.5.

JP 61-54750 B discloses that by adjusting an open porosity and an average pore diameter, it is possible to design a filter from a high-capturing rate to a low-capturing rate. It describes that the preferred range of porosity is 33–90%.

Japanese Patent 2,578,176 discloses a porous ceramic honeycomb filter having a long particulates-capturing time, the porosity being 40–55%, and the volume of pores having diameters of 2 $\mu$m or less being 0.015 cm$^3$/g or less.

JP 9-77573 A discloses a honeycomb structure having a high capturing rate, a low pressure loss and a low thermal expansion ratio, which has a porosity of 55–80% and an average pore diameter of 25–40 $\mu$m, pores in its partition walls being composed of small pores having diameters of 5–40 $\mu$m and large pores having diameters of 40–100 $\mu$m, and the number of small pores being 5–40 times that of large pores.

However, because these porous ceramic honeycomb filters have high porosity, they inevitably have low strength. In addition, because relatively flat powder such as carbon, graphite, etc. is used as a pore-forming material, pores have acute corners with large aspect ratios in their transverse cross sections. Therefore, stress concentration is likely to occur in the pores, causing decrease in the strength of the ceramic honeycomb structure. Thus, when it is used for particulates-capturing filters for exhaust gases from diesel engines, it is likely to be broken by thermal stress and shock, a mechanical fastening force at the time of assembling, vibration, etc.

OBJECTS OF THE INVENTION

Accordingly, an object of the present invention is to provide a ceramic honeycomb filter having small pressure loss free from cracking due to thermal stress and thermal shock at the time of regenerating the filter, and a ceramic honeycomb structure used therefor.

Another object of the present invention is to provide a ceramic honeycomb structure, in which cracking is less likely to propagate continuously in a diagonal direction of cells along partition wall intersections on which stress is concentrated.

A further object of the present invention is to provide a high-strength ceramic honeycomb structure capable of being used as a particulates-capturing filter stably for a long period of time even with porosity of 50% or more.

DISCLOSURE OF THE INVENTION

As the result of intensive research on partition walls and sealers of honeycomb filters in view of the above objects, the inventors have found that by adjusting the porosity, pore shapes and seal depth of sealers combined with partition walls, pressure loss can be reduced without lowering breakage resistance. The present invention has been completed based on this finding.

The first ceramic honeycomb filter of the present invention comprises a ceramic honeycomb structure having porous partition walls defining a plurality of flow paths for flowing an exhaust gas through the porous partition walls to remove particulates from the exhaust gas, wherein one end of each flow path is provided with a sealer, such that sealers of the flow paths in an inlet and an outlet of the ceramic honeycomb structure in a desired pattern; wherein the partition walls have thickness of 0.1–0.5 mm and a porosity of 50–80%; wherein the porosity of the sealers is larger than that of partition walls; and wherein the depth of the sealers is 3–15 mm.

The second ceramic honeycomb filter of the present invention comprises a ceramic honeycomb structure having porous partition walls defining a plurality of flow paths for flowing an exhaust gas through the porous partition walls to remove particulates from the exhaust gas, wherein one end of each flow path is provided with a sealer, such that sealers of the flow paths in an inlet and an outlet of the ceramic honeycomb structure in a desired pattern; wherein the sealers have pores; and wherein at least part of the pores have substantially circular cross sections.

The first ceramic honeycomb structure of the present invention has porous partition walls defining a plurality of flow paths, the partition walls forming the flow paths having nonuniform thickness. The average thickness $T_{av}$, the maximum thickness $T_{max}$ and the minimum thickness $T_{min}$ of the partition walls preferably satisfy the conditions of $T_{av}/(T_{max}-T_{min}) \leq 40$.

The second ceramic honeycomb structure of the present invention has porous partition walls defining a plurality of flow paths, a transverse cross section of each flow path being in a substantially square shape as a whole; a transverse cross section of at least part of flow paths being arcuate in one pair of opposing corners; and the one pair of opposing corners being larger than the other pair of opposing corners in a radius of curvature in each flow path.

The ceramic honeycomb filter and structure according to a preferred embodiment of the present invention have a porosity of 50–80%, at least part of pores having cross section areas of 1,000 $\mu m^2$ or more in an arbitrary cross section of the partition walls having circular cross sections.

The ceramic honeycomb filter and structure according to preferred embodiment of the present invention have a porosity of 50–80%, the percentage of the number of pores having aspect ratios of 2 or less being 60% or more among pores having cross section areas of 1,000 $\mu m^2$ or more in an arbitrary cross section of the partition walls.

In the ceramic honeycomb filter and structure of the present invention, the percentage of the number of pores having roundness of 1–10 is preferably 50% or more among pores having cross section areas of 1,000 $\mu m^2$ or more in an arbitrary cross section of the partition walls. The porosity is preferably 60–70%. The average pore diameter of pores is preferably 10–40 $\mu m$. The thickness of the partition walls is preferably 0.1–0.5 mm, and the interval of the partition walls is preferably 1–3.5 mm. The preferred honeycomb filter and structure of the present invention have an A-axis compression strength of 3 MPa or more.

The ceramic honeycomb filter and structure of the present invention are preferably made of cordierite having a main component chemical composition comprising 42–56% by mass of $SiO_2$, 30–45% by mass of $Al_2O_3$, and 12–16% by mass of MgO.

DESCRIPTION OF THE PREFERRED EMBODIMENTS

[1] First Embodiment

Figure 1A:
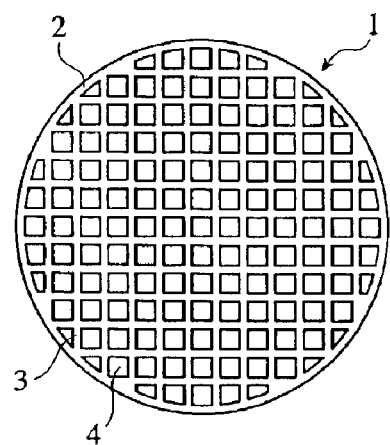
FIG. 1(a) is a front view showing one example of ceramic honeycomb structures.
Figure 1B:
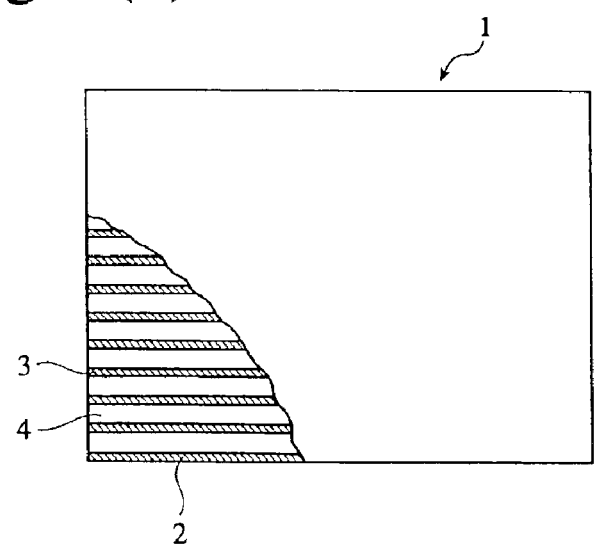
FIG. 1(b) is a partially cross-sectional side view showing the ceramic honeycomb structure of FIG. 1(a)

In the first embodiment, the ceramic honeycomb structure has a porosity of 50–80%, relatively large-diameter pores, specifically pores having cross section areas of 1,000 $\mu m^2$ or more in partition walls, contain those having substantially circular cross sections. This reduces the percentage of the number of pores having acute corners, making it unlikely that stress concentration occurs in the corners of pores, and thus resulting in improvement in the strength of the ceramic honeycomb structure. The term "pores are substantially circular" in partition walls means that the roundness represented by the formula of length of circumference×length of circumference/(4π×area of pore) is within a range of 1–10. In the case of a circle, the roundness is 1, and the roundness becomes larger as the cross section shape of a pore becomes deviated from a circle.

When the porosity is less than 50%, the ceramic honeycomb structure has a large pressure loss when used as a diesel particulate filter, resulting in poor exhaust efficiency of diesel engines. On the other hand, when the porosity is more than 80%, there is too large a percentage of the number of pores even though relatively large-diameter pores have substantially circular cross sections, resulting in the ceramic honeycomb structure with insufficient strength and poor particulates-capturing efficiency. Accordingly, the ceramic honeycomb structure of the present invention has a porosity of 50–80%. The preferred range of the porosity is 60–70%.

The percentage of the number of pores having roundness of 1–10 is preferably 50% or more among pores having cross section areas of 1,000 $\mu m^2$ or more (relatively large-diameter pores) in an arbitrary cross section of the partition walls. When there is a high percentage of the number of pores having roundness of 1–10 (with substantially circular cross sections), there is a low percentage of the number of pores having acute corners, which are likely to become starting points of breakage, resulting in the ceramic honeycomb structure with high strength.

The percentage of the number of pores having aspect ratios of 2 or less is preferably 60% or more among pores having cross section areas of 1,000 $\mu m^2$ or more in an arbitrary cross section of the partition walls. This reduces the percentage of the number of pores having acute corners, making it unlikely that stress is concentrated on the pores, and thus resulting in the ceramic honeycomb structure with high strength.

The pores existing in the ceramic honeycomb structure of the present invention preferably has an average pore diameter of 10–40 $\mu m$. When the average diameter of the pores is less than 10 $\mu m$, it is likely to exhibit a large pressure loss when used as a diesel particulate filter, resulting in deterioration of the efficiency of diesel engines. On the other hand, when the average pore diameter of the pores exceeds 40 $\mu m$, the strength of the ceramic honeycomb structure becomes too low, resulting in decrease in the particulates-capturing efficiency.

In a preferred embodiment of the present invention, the partition walls having thickness of 0.1–0.5 mm are formed at an interval of 1–3.5 mm. When the thickness of the partition walls is more than 0.5 mm, or when the interval of the partition walls is less than 1 mm, it is likely to suffer from large pressure loss when used as a diesel particulate filter, failing to obtain sufficient filter characteristics. On the other hand, when the thickness of the partition walls is less than 0.1 mm, or when the interval of the partition walls is more than 3.5 mm, the ceramic honeycomb structure is likely to have too low strength. The more preferred thickness of the partition walls is 0.2–0.4 mm.

In a preferred embodiment of the present invention, the ceramic honeycomb structure of the present invention has an A-axis compression strength of 3 MPa or more. When the A-axis compression strength is 3 MPa or more, the ceramic honeycomb structure is not broken by thermal stress and thermal shock when used as a diesel particulate filter, a mechanical fastening force at the time of assembling, vibration, etc.

[2] Second Embodiment

In the second embodiment, the partition walls of the ceramic honeycomb filter have thickness of 0.1–0.5 mm and a porosity of 50–80%, the porosity of sealers is larger than that of partition walls, and the seal depth is 3–15 mm. This structure can satisfy two contradictory requirements of a low pressure loss and an excellent breakage resistance. Specifically, because partition walls have thickness of 0.1–0.5 mm and as high porosity as 50–80%, the exhaust gas passes through the partition walls with low resistance (pressure loss). Also, with the porosity of sealers larger than that of partition walls and with the seal depth of 3–15 mm, part of the exhaust gas passes through the sealers, resulting in decrease in pressure loss. Further, because the sealers have a small thermal capacity per a unit area, the sealers is unlikely to suffer from cracking even with a thermal shock.

Specifically, the porosity of sealers is larger than that of partition walls preferably by 5% or more, more preferably by 10% or more.

The porosity of sealers is preferably 70–90%. When the porosity of sealers is less than 70%, the percentage of an exhaust gas passing through the sealers is low, resulting in an insufficient effect of reducing pressure loss. On the other hand, when the porosity of sealers is more than 90%, the sealers has insufficient strength, making it likely that chipping and cracking are generated particularly on both end surfaces at the time of canning and handling, and that large particulates in an exhaust gas cannot be captured. The porosity of sealers is particularly preferably 75%–85%. Incidentally, the porosity of sealers may be the same or different between the inlet and outlet sides as long as it is within the above range.

When the seal depth is less than 3 mm, adhesion strength is low between the sealers and the partition walls, making it likely that the sealers peel off by mechanical shock and thermal shock. On the other hand, when the seal depth is more than 15 mm, the filter has a small effective area. Accordingly, the seal depth is 3–15 mm. The more preferred seal depth is 5–12 mm.

Because at least part of pores in the sealers have substantially circular cross sections, stress concentration can be prevented in the pores, resulting in increased porosity while keeping the strength of the sealers. Accordingly, it is possible to obtain a ceramic honeycomb filter with high breakage resistance and low pressure loss. All pores in the sealers need not have substantially circular cross sections, particularly large pores, for instance, pores having cross section areas of 1,000 $\mu m^2$ or more, contain those having substantially circular cross sections. With respect to the pores in the sealers, "substantially circular cross section" means that the pores have aspect ratios (longest diameter/shortest diameter) of 2 or less.

The percentage of the number of pores having aspect ratios of 2 or less among those having cross section areas of 1,000 $\mu m^2$ or more in the sealers is preferably 20% or more. To form the pores having substantially circular cross sections, it is preferable to add a substantially spherical pore-forming material to a slurry for sealers and sinter the resultant sealers to burn off the pore-forming material.

In a preferred embodiment of the present invention, the sealers formed on at least one end of the ceramic honeycomb structure preferably have concaved inner and/or outer surfaces. With the sealers provided with concaved inner and/or outer surfaces, resistance to an exhaust gas (pressure loss) can be reduced while keeping adhesion strength (breakage resistance) between the sealers and the partition walls.

Figure 4:
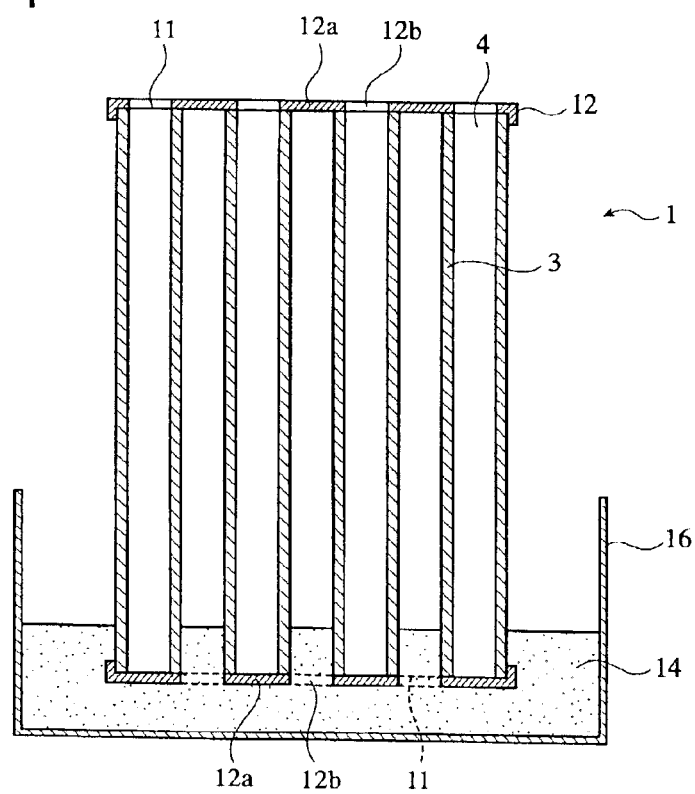
FIG. 4 is a schematic cross-sectional view showing a method for producing the honeycomb filter of FIG. 3.

FIG. 4 shows one example of methods for sealing the ends of a ceramic honeycomb structure. After attaching masking films 12 to the ends of the ceramic honeycomb structure 1, the masking films 12 are provided with punctured portions (openings) 12b in a pattern as shown in FIG. 2. The ceramic honeycomb structure 1 thus provided with the masking films 12 is immersed in a slurry 14 for sealers in a container 16. To provide the sealers with a predetermined porosity, ceramic materials with large particle size are used for the slurry 14, or pore-forming materials are added thereto. Particularly when pores having substantially circular cross sections are formed in the sealers, it is preferable that spherical pore-forming materials (for instance, resin beads, preferably hollow resin beads) are added to ceramic sealer materials, and that the pore-forming materials are burned off by sintering.

The slurry 14 penetrates into cells (flow paths) 4 of the ceramic honeycomb structure 1 immersed in the slurry 14 through the openings 12b of the masking film. After drying the slurry 14, the ceramic honeycomb structure 1 is turned upside down, so that the slurry 14 similarly penetrates into end portions of cells on the opposite side. After drying the slurry 14, the masking film 12 is peeled off. By adjusting the immersion depth of the ceramic honeycomb structure 1 in the slurry 14, the seal depth of 3–15 mm can be obtained. Finally, the sealers are sintered to become integral with the partition walls.

[3] Third Embodiment

Figure 5A:
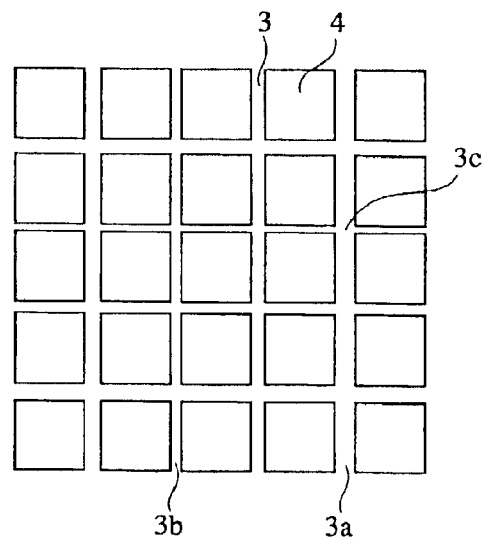
FIG. 5(a) is a partial front view showing one example of partition walls in the ceramic honeycomb structure of the present invention.
Figure 5B:
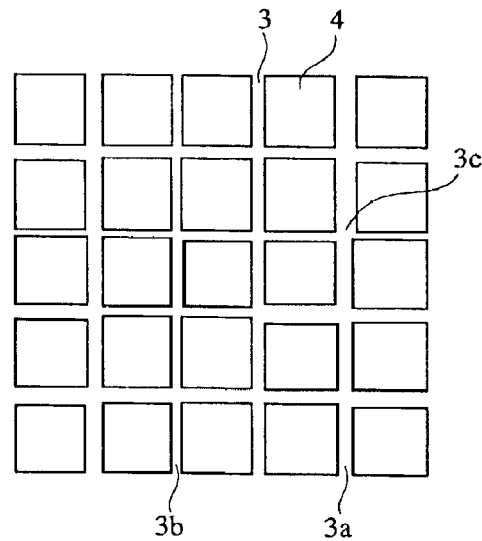
FIG. 5(b) is a partial front view showing another example of partition walls in the ceramic honeycomb structure of the present invention.
Figure 5C:
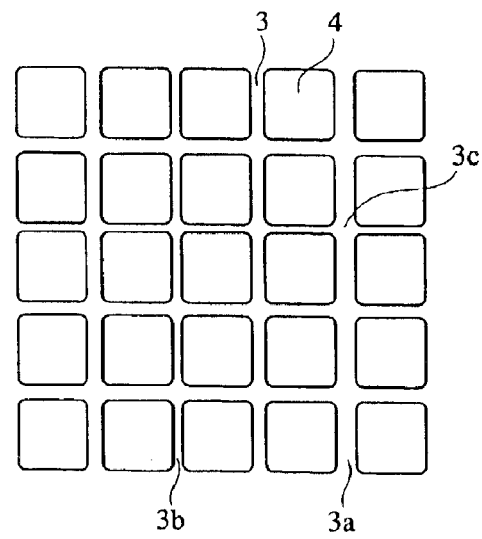
FIG. 5(c) is a partial front view showing a further example of partition walls in the ceramic honeycomb structure of the present invention.
Figure 6:
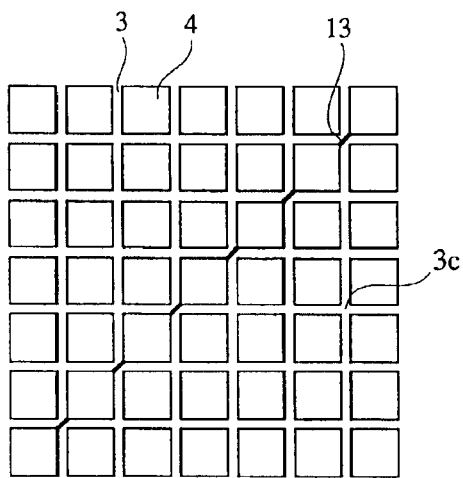
FIG. 6 is a schematic front view showing an example of the breakage of the ceramic honeycomb structure of FIG. 13(a)

The partition walls of the ceramic honeycomb structure in the third embodiment have nonuniform thickness. As shown in FIGS. 5(a) to 5(c), for instance, the partition walls 3a, 3b of the ceramic honeycomb structure 1 have different thickness in a transverse cross section. Because the partition walls 3 has nonuniform thickness, partition wall intersections 3c have different strength from cell to cell, not constant in the ceramic honeycomb structure. Because no partition wall intersections 3c having substantially the same strength exist continuously, it is possible to prevent a phenomenon that cracking propagates continuously along the partition wall intersections 3c by thermal shock or stress, so that the ceramic honeycomb structure is broken in a diagonal direction of cells. Thus, this ceramic honeycomb structure has excellent thermal shock resistance. Incidentally, because the partition wall intersections 3c shown in FIG. 5(c) have curved surfaces, it is advantageous in that it suffers from little stress concentration.

The average thickness $T_{av}$, the maximum thickness $T_{max}$ and the minimum thickness $T_{min}$ of the partition walls 3 preferably meet the relation of $T_{av}/(T_{max}-T_{min}) \leq 40$. The value of $T_{av}/(T_{max}-T_{min})$ indicates how nonuniform the thickness of the partition walls 3 is relative to its average thickness. When $T_{av}/(T_{max}-T_{min})$ is 40 or less, the thickness of partition walls is sufficiently nonuniform, thereby preventing cracking from propagating continuously along the partition wall intersections 3c by thermal shock or stress. On the other hand, when $T_{av}/(T_{max}-T_{min})$ exceeds 40, the nonuniformity of the thickness of partition walls becomes insufficient, so that cracking is likely to propagate continuously along the partition wall intersections 3c by thermal shock or stress.

The value of $T_{av}/(T_{max}-T_{min})$ is preferably 1–40, more preferably 2–30. When the lower limit of $T_{av}/(T_{max}-T_{min})$ is less than 1, there is too large difference between the minimum wall thickness $T_{min}$ and the maximum wall thickness $T_{max}$, resulting in poor speed balance of a molding blend discharged from slits of an orifice means of an extrusion-molding die, which leads to the bending or breakage of the resultant green bodies.

[4] Fourth Embodiment

Figure 10:
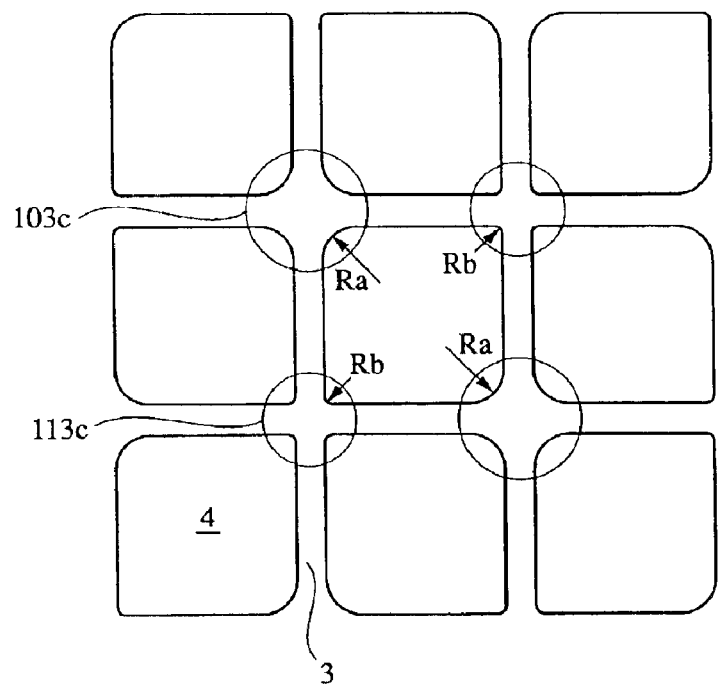
FIG. 10 is an enlarged view of a portion B in FIG. 8.

In the fourth embodiment, the radii of curvature Ra, Rb of flow path corners, on which stress is concentrated, are different between adjacent corners as shown in FIG. 10, so that adjacent partition wall intersections 103c, 113c have different strength. Accordingly, partition wall intersections having substantially the same strength do not align, resulting in large cracking resistance. Therefore, cracking is less likely to propagate even though excessive thermal or mechanical shock is applied to the ceramic honeycomb structure.

In order that the adjacent partition wall intersections do not have substantially the same strength, a ratio of the radius of curvature Ra of one pair of opposing corners (slowly curved surfaces) to the radius of curvature Rb of the other pair of opposing corners (steeply curved surfaces) is preferably 1.5 or more. When the ratio of Ra/Rb is less than 1.5, there is only small difference in strength between the adjacent partition wall intersections, resulting in small cracking resistance.

Figure 8:
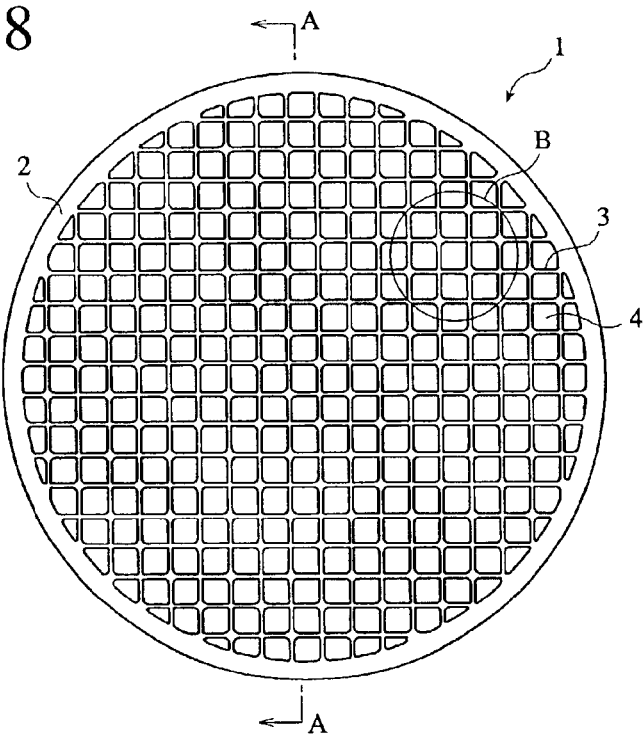
FIG. 8 is a front view showing one example of ceramic honeycomb structures of the present invention.
Figure 9:
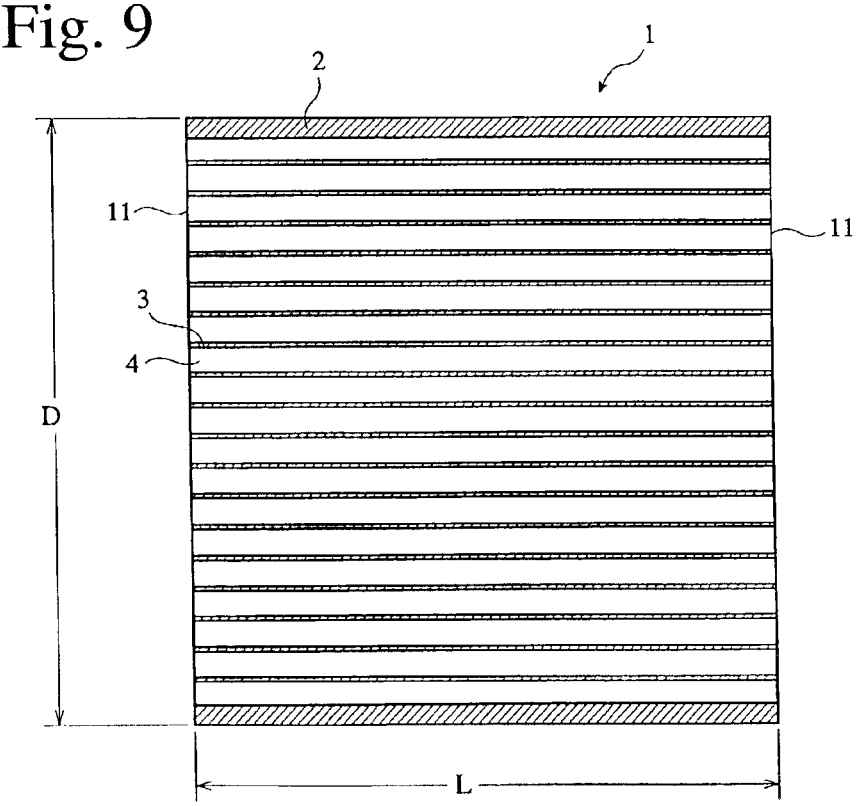
FIG. 9 is a cross-sectional view taken along the line A—A in FIG. 8(a)

As shown in FIGS. 8–10, in a transverse cross section of each flow path 4, one pair of opposing arcuate corners facing large partition wall intersections 103c have a radius of curvature Ra, and the other pair of opposing corners facing small partition wall intersections 113c have a radius of curvature Rb. The radius of curvature Ra is larger than the radius of curvature Rb. In the depicted embodiment, the large partition wall intersections 103c and the small partition wall intersections 113c are arranged alternately in vertical directions. However, the partition wall intersections may be formed such that four corners of each flow path 4 have different radii of curvature.

Because the partition wall intersections having substantially the same strength are not adjacent to each other as described above, the ceramic honeycomb structure 1 has a large cracking resistance, thereby having improved thermal shock resistance strength and isostatic strength. Therefore, it is not likely that cracking is generated and propagates even though the ceramic honeycomb structure 1 is subjected to thermal shock by a high-temperature exhaust gas, or mechanical shock by vibration of engines, vibration due to contact with road surfaces, etc.

Figure 11A:
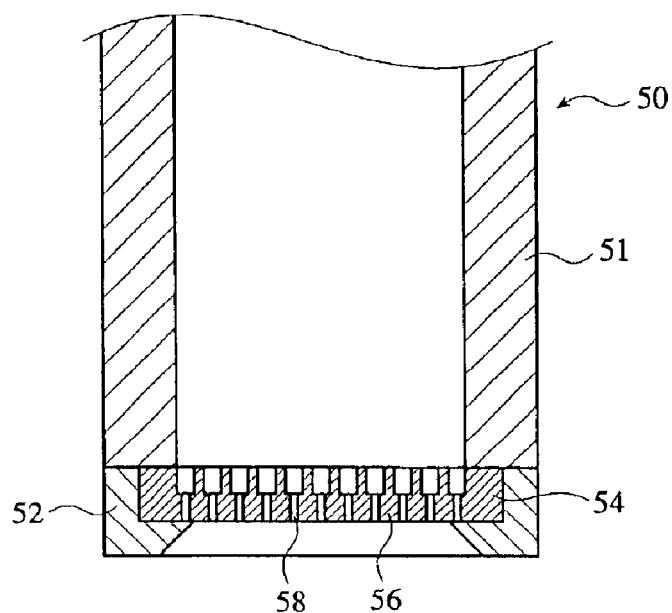
FIG. 11(a) is a cross-sectional view showing a die used for the extrusion molding of the ceramic honeycomb structure.
Figure 11B:
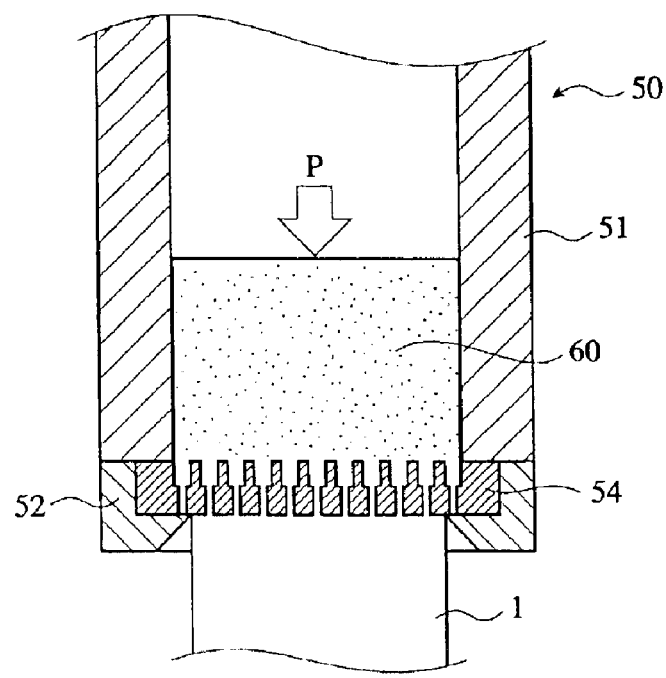
FIG. 11(b) is a cross-sectional view showing the extrusion molding of a ceramic honeycomb structure using the die of FIG. 11(a)
Figure 12:
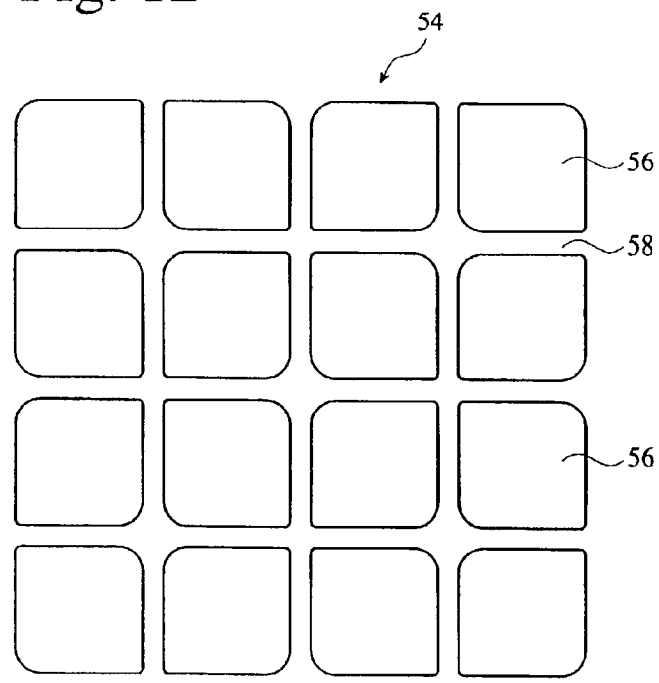
FIG. 12 is a front view showing an orifice means in the die of FIG. 11(a)
Figure 13A:
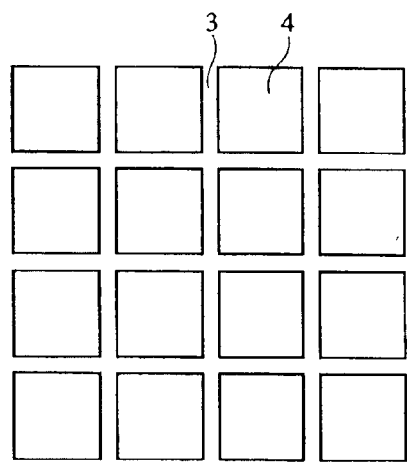
FIG. 13(a) is a front view showing one example of partition walls in a conventional ceramic honeycomb structure.
Figure 13B:
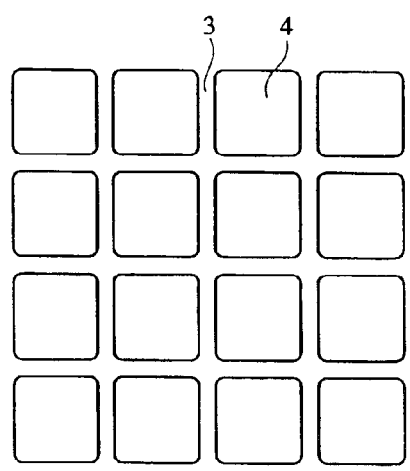
FIG. 13(b) is a front view showing another example of partition walls in a conventional ceramic honeycomb structure.

FIGS. 11 and 12 show an extrusion-molding die used for the production of the ceramic honeycomb structure 1, and an extrusion-molding method using it. The extrusion-molding die 50 comprises a die body 51 for receiving a molding blend 60, a holder 52 mounted onto a tip end of the die body 51, and an extrusion-molding orifice means 54 held in the holder 52. The orifice means 54 comprises a large number of pins 56 arranged in a lattice pattern, and gaps between the pins 56 are extrusion outlets 58 for the molding blend. Corners of each pins 56 have curved surfaces, and the radius of curvature Ra of one pair of opposing curved surfaces is larger than the radius of curvature Rb of the other pair of opposing corners. Incidentally, curved corners of the pins 52 may be formed by a grinding method, a discharge-working method, an electroplating method, an electro-etching method, etc. As shown in FIG. 11(b), a ceramic material blend contained in the die body 51 is extruded through the extrusion outlets 58 in a lattice pattern by a plunger, etc. at pressure P, to form the ceramic honeycomb structure 1.

The ceramic honeycomb filter of the present invention used as a filter for removing particulates from an exhaust gas mainly from diesel engines is constituted by a porous ceramic honeycomb structure and sealers, which are preferably formed by ceramic materials with excellent heat resistance. Among them, it is preferable to use ceramic materials comprising at least one selected from the group consisting of cordierite, alumina, mullite, silicon nitride, silicon carbide and lithium aluminum silicate (LAS) as main components. Particularly, cordierite is most preferable because it is inexpensive and has excellent heat resistance and corrosion resistance and low thermal expansion. In the case of cordierite, it preferably has a main component chemical composition comprising 42–56% by mass of $SiO_2$, 30–45% by mass of $Al_2O_3$, and 12–16% by mass of MgO.

When the amount of particulates captured by the ceramic honeycomb filter of the present invention has reached a predetermined level, the ceramic honeycomb filter is regenerated by an alternating regeneration method for burning particulates by a burner or an electric heater, a continuous regeneration method for continuously burning particulates by the action of a catalyst carried on the ceramic honeycomb structure, etc.

Though the ceramic honeycomb filters and their structures according to of the present invention have been explained above separately in each embodiment, it should be understood that the features of the ceramic honeycomb filters and their structures (for instance, thickness and porosity of partition walls, etc.) described in these embodiments may be common in all embodiments unless otherwise mentioned.

The present invention will be explained in detail referring to Examples below without intention of restricting the present invention thereto.

EXAMPLES 1–7

Reference Examples 1–6

To form cordierite having a main component composition comprising 49–51% by mass of $SiO_2$, 35–37% by mass of $Al_2O_3$ and 13–15% by mass of MgO, a cordierite-forming starting material powder comprising kaolin powder, calcined kaolin powder, alumina powder, aluminum hydroxide powder, silica powder and talc powder was mixed with a binder, a lubricant and spherical resin powder as a pore-forming material in predetermined amounts, and further fully mixed with water in a predetermined amount to form a plasticizable batch capable of being extrusion-molded to a honeycomb shape.

With the size of an extrusion die and the amount of a pore-forming material adjusted, honeycomb green bodies with square cross sections of flow paths and partition walls having various thickness and porosity were produced. Each green body was sintered after drying, to form a ceramic honeycomb structure of 150 mm in diameter and 150 mm in length. A pitch of partition walls was 1.5 mm in the resultant ceramic honeycomb structures, and the partition walls had various levels of thickness and porosity. Incidentally, the porosity of the partition walls were measured according to a mercury penetration method using Autopore III9410 available from Micromeritics.

As shown in FIG. 4, masking films 12 were attached to both end surfaces 11, 11 of each ceramic honeycomb structure with an adhesive, and each masking film 12 was punctured to have sealers 12a and openings 12b in a checkered pattern, such that only one end of each flow path 4 was sealed.

The same cordierite-forming starting material powder as above was mixed with a pore-forming material, water and a binder to form a slurry 14, which was charged into a container 16. To obtain sealers with various levels of porosity, the amount of the pore-forming material added to each slurry 14 was changed.

As shown in FIG. 4, one end 11 of the ceramic honeycomb structure 1 was immersed in a slurry 14 to a predetermined depth, to introduce the slurry 14 into flow paths 4 through the openings 12a of the masking film 12. Lifting the ceramic honeycomb structure 1, the slurry 14 charged into its end portions was fully dried, and the ceramic honeycomb structure 1 was turned upside down to carry out immersion in the same slurry 14 and a drying treatment. After all the slurry 14 attached to the ceramic honeycomb structure 1 was dried, the masking films 12 were peeled. Thus, the ceramic honeycomb structure 1 was provided with sealers 5 at both ends in predetermined patterns. Finally, the ceramic honeycomb structures 1 provided with sealers 5 were sintered in a batch-type sintering furnace (not shown), to obtain ceramic honeycomb filters 10 with sealers having various levels of porosity.

With respect to the resultant honeycomb filters 10, the thickness and porosity of partition walls 3 and the porosity and depth of sealers 5 were measured. Also, each honeycomb filter 10 was evaluated with respect to pressure loss and thermal shock resistance as follows:

(a) Pressure Loss

After causing to flow air containing carbon black at a predetermined flow rate through each honeycomb filter 10 for 2 hours in a pressure loss-testing apparatus (not shown) such that the flow rate of carbon black is 3 g/hour, pressure difference between the inlet and outlet of the honeycomb filter 10 was determined. The evaluation standards of the pressure loss are described below. Incidentally, 400 mmAq or less (⊚ and ○) was regarded as "pass."

⊚: Less than 380 mmAq,

○: 380–400 mmAq, and

×: More than 400 mmAq.

(b) Thermal Shock Resistance

Each filter 10 was kept in an electric furnace set at various temperatures for 30 minutes and then rapidly cooled to room temperature, to observe the presence of cracking by the naked eye. Difference between the heating temperature and room temperature (25° C.) when cracking appeared was called a thermal shock-resistant temperature. The evaluation standards of the thermal shock-resistant temperature were as follows: Incidentally, 600° C. or more was regarded as "pass."

⊚⊚: 700° C. or higher,
⊚: 650° C. or higher and lower than 700° C.,
◯: 600° C. or more and lower than 650° C., and
×: Lower than 600° C.

The overall evaluation of the pressure loss and the thermal shock resistance was conducted according to the following standards:

⊚⊚: Pressure loss was ⊚, and thermal shock resistance was ⊚⊚.
⊚: Both of pressure loss and thermal shock resistance were ⊚.
◯: Both of pressure loss and thermal shock resistance were "pass."
×: Any one of pressure loss and thermal shock resistance was ×.

The thickness and porosity of partition walls, the porosity and seal depth of sealers, and the evaluation results of pressure loss and thermal shock resistance as well as the overall evaluations in each honeycomb filter 10 are shown in Table 1.

TABLE 1

| No. | Ceramic Honeycomb Structure | | Sealers | |
|---|---|---|---|---|
| | Thickness of Partition Walls (mm) | Porosity (%) | Porosity (%) | Seal Depth (mm) |
| Example 1 | 0.15 | 50 | 55 | 3 |
| Example 2 | 0.20 | 55 | 65 | 5 |
| Example 3 | 0.22 | 60 | 69 | 10 |
| Example 4 | 0.22 | 65 | 75 | 10 |
| Example 5 | 0.25 | 75 | 80 | 12 |
| Example 6 | 0.31 | 65 | 80 | 11 |
| Example 7 | 0.30 | 78 | 85 | 15 |
| Reference Example 1 | 0.08 | 51 | 55 | 5 |
| Reference Example 2 | 0.12 | 45 | 22 | 2 |
| Reference Example 3 | 0.28 | 70 | 45 | 12 |
| Reference Example 4 | 0.25 | 85 | 90 | 15 |
| Reference Example 5 | 0.60 | 51 | 55 | 5 |
| Reference Example 6 | 0.15 | 50 | 55 | 18 |

| No. | Evaluation Results | | |
|---|---|---|---|
| | Pressure Loss | Thermal Shock Resistance | Overall Evaluation |
| Example 1 | ◯ | ◯ | ◯ |
| Example 2 | ◯ | ◯ | ◯ |
| Example 3 | ◯ | ◯ | ◯ |
| Example 4 | ⊚ | ◯ | ◯ |
| Example 5 | ⊚⊚ | ◯ | ◯ |
| Example 6 | ⊚⊚ | ◯ | ◯ |
| Example 7 | ⊚⊚ | ◯ | ◯ |
| Reference Example 1 | ◯ | × | × |
| Reference Example 2 | × | × | × |
| Reference Example 3 | × | × | × |
| Reference Example 4 | ⊚⊚ | × | × |
| Reference Example 5 | × | ◯ | × |
| Reference Example 6 | × | ◯ | × |

In the honeycomb filters of Examples 1–7, the partition walls had thickness within 0.1–0.5 mm and a porosity within 50–80%, and the sealers had larger porosity than that of the partition walls. Also, the seal depth was 3–15 mm. Accordingly, the evaluations of pressure loss and thermal shock resistance were good, and the overall evaluation was ◯. Particularly in Examples 4–7, because the porosity of the sealers was within a preferred range of 70–90%, the evaluation of pressure loss was ⊚.

Because the thickness of partition walls was less than 0.1 mm in the honeycomb filter of Reference Example 1, its thermal shock resistance was poor. Because the honeycomb filter of Reference Example 2 had porosity of less than 50% in partition walls, with the porosity of sealers being smaller than that of the partition walls, it suffered from large pressure loss. Also, because it had a seal depth of less than 3 mm, it had a poor thermal shock resistance. Because the porosity of sealers was smaller than that of the partition walls in the honeycomb filter of Reference Example 3, it had a large pressure loss and a poor thermal shock resistance. Because the porosity of partition walls exceeded 80% in the honeycomb filter of Reference Example 4, it had a poor thermal shock resistance. Because the thickness of partition walls exceeded 0.5 mm in the honeycomb filter of Reference Example 5, it had a large pressure loss. Because the seal depth exceeded 15 mm in the honeycomb filter of Reference Example 6, it had a large pressure loss.

EXAMPLES 8–13

A cordierite ceramic honeycomb filter 10 of 150 mm in outer diameter and 150 mm in length with 0.3-mm-thick partition walls at a pitch of 1.5 mm was produced in the same manner as in Example 1. The porosity of partition walls was 65%, the porosity of sealers was 78%, and the seal depth was 10 mm. In Examples 8–11, slurries 14 for sealers contained a spherical pore-forming material in the form of beads made of an acrylonitrile-methyl methacrylate copolymer resin in various amounts.

Figure 14:
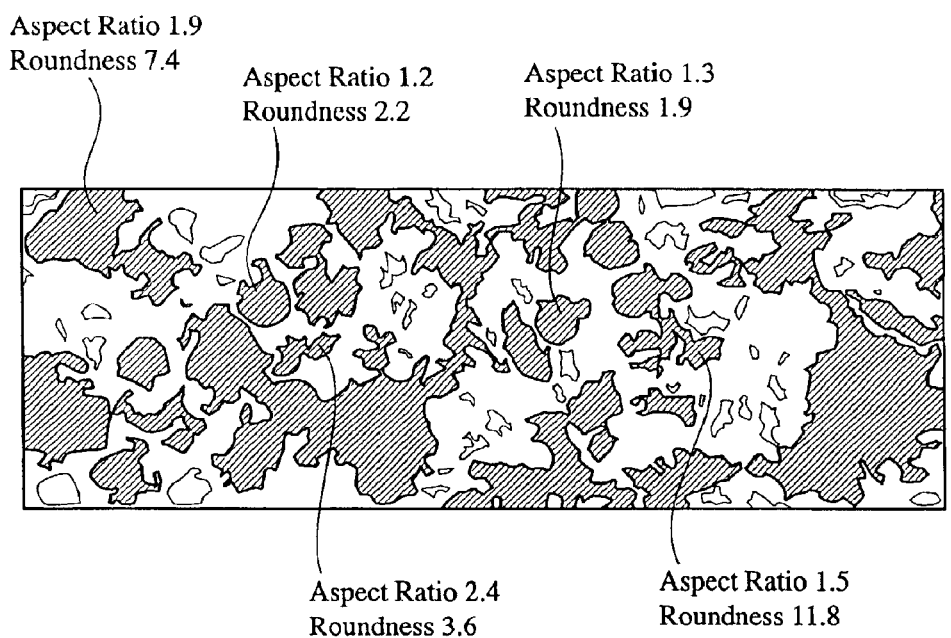
FIG. 14 is a schematic view showing an example of a cross section of a partition wall, from which the aspect ratio and roundness of pores are determined.

In each honeycomb filter 10, an arbitrary transverse cross section of a sealer was ground, and its SEM photograph was analyzed by the naked eye to determine whether or not there were pores having substantially circular cross sections. The SEM photograph was further analyzed by a commercially available image analysis software (Image-Pro Plus version 3.0 available from Media Cybernetics) to determine an aspect ratio of pore cross sections as illustrated in FIG. 14, thereby calculating among pores having cross section areas of 1,000 $\mu m^2$ or more, the percentage of the number of pores having aspect ratios of 2 or less was calculated.

With respect to each ceramic honeycomb filter, pressure loss and thermal shock resistance were evaluated in the same manner as in Example 1. The presence or absence of pores having substantially circular cross sections, the percentage of the number of pores having aspect ratios of 2 or less in their transverse cross sections, the pressure loss, the thermal shock resistance and the overall evaluation are shown in Table 2.

TABLE 2

| | Sealers | | | | |
|---|---|---|---|---|---|
| No. | Pores Having Substantially Circular Cross Sections | Percentage of Pores Having Aspect Ratios of 2 or Less (%)[(1)] | Pressure Loss | Thermal Shock Resistance | Overall Evaluation |
| Example 8 | yes | 15 | ⊚ | ⊚ | ⊚ |
| Example 9 | yes | 12 | ⊚ | ⊚ | ⊚ |
| Example 10 | yes | 42 | ⊚ | ⊚⊚ | ⊚⊚ |
| Example 11 | yes | 65 | ⊚ | ⊚⊚ | ⊚⊚ |
| Example 12 | no | 0 | ⊚ | ○ | ○ |
| Example 13 | no | 0 | ⊚ | ○ | ○ |

Note:
[(1)]The percentage of the number of pores having aspect ratios of 2 or less in transverse cross sections.

Because the honeycomb filters of Examples 8–11 had pores having substantially circular cross sections in their sealers, they had low pressure loss and excellent thermal shock resistance. Because the evaluation of the thermal shock resistance was ⊚ or ⊚⊚ in any honeycomb filters, their overall evaluations were ⊚ or ⊚⊚. Particularly in the honeycomb filters of Example 10 and 11, the percentage of the number of pores having aspect ratios of 2 or less among those having cross section areas of 1,000 $\mu m^2$ or more in sealers was 20% or more, the evaluation of thermal shock resistance was ⊚⊚, and their overall evaluation was ⊚⊚. On the other hand, because the honeycomb filters of Examples 12 and 13 did not have pores having substantially circular cross sections in their sealers, their evaluation of thermal shock resistance was ○, and thus their overall evaluation was ○.

EXAMPLES 14–23

To form cordierite having the same main component chemical composition as in Example 1, a cordierite-forming starting material powder comprising kaolin powder, calcined kaolin powder, alumina powder, aluminum hydroxide powder, silica powder and talc powder was mixed with a binder, a lubricant and spherical resin powder as a pore-forming material in predetermined amounts. Water was added to the resultant mixture to form plasticizable molding batches.

Using an extrusion die having an orifice means, whose slit width was controlled such that the resultant ceramic honeycomb structure had partition walls having nonuniform thickness, each molding batch was extrusion-molded to obtain a honeycomb green body having partition walls shown in FIG. 5(a). The resultant green body was sintered at 1400° C. to obtain a cordierite ceramic honeycomb structure of 267 mm in outer diameter and 300 mm in length.

Figure 7A:
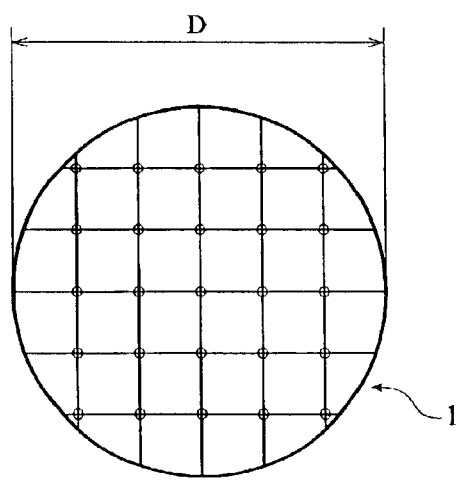
FIG. 7(a) is a view showing points at which the thickness of the partition walls of the ceramic honeycomb structure was measured.
Figure 7B:
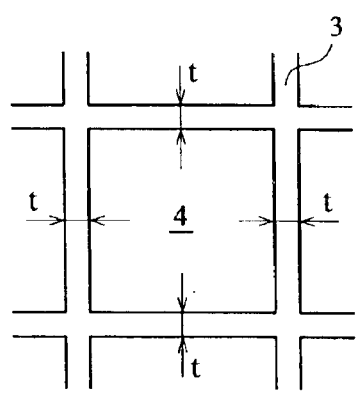
FIG. 7(b) is a partial enlarged view of FIG. 7(a)

As shown in FIGS. 7(a) and (b), 25 cells in total, 5 cells along the X-axis and the Y-axis, respectively, were observed in the ceramic honeycomb structure 1, to measure the thickness t of four partition walls encircling each cell at their middle points by a 100-times projector. The average thickness $T_{av}$, the maximum thickness $T_{max}$ and the minimum thickness $T_{min}$ of the partition walls 3 were determined from the resultant 100 measured values in total to calculate $T_{av}/(T_{max}-T_{min})$. In addition, the thermal shock resistance of each ceramic honeycomb structure was evaluated in the same manner as in Example 1. These results are shown in Table 3. Incidentally, the number of cells in the ceramic honeycomb structure 1 was 46.5/cm², and the pores had a porosity of 65% and an average pore diameter of 20 $\mu$m.

TABLE 3

| | Thickness of Partition Walls | | | | |
|---|---|---|---|---|---|
| No. | Average Thickness $T_{av}$ (mm) | Maximum Thickness $T_{max}$ (mm) | Minimum Thickness $T_{min}$ (mm) | $T_{av}/(T_{max} - T_{min})$ | Thermal Shock-Resistant Temperature (° C.) |
| Example 14 | 0.30 | 0.355 | 0.251 | 2.9 | 767 |
| Example 15 | 0.30 | 0.320 | 0.284 | 8.3 | 767 |
| Example 16 | 0.31 | 0.320 | 0.295 | 12 | 758 |
| Example 17 | 0.31 | 0.316 | 0.305 | 28 | 742 |
| Example 18 | 0.30 | 0.304 | 0.296 | 38 | 717 |
| Example 19 | 0.30 | 0.320 | 0.278 | 7.1 | 750 |
| Example 20 | 0.32 | 0.333 | 0.308 | 13 | 741 |
| Example 21 | 0.29 | 0.293 | 0.286 | 41 | 692 |
| Example 22 | 0.31 | 0.303 | 0.296 | 44 | 667 |
| Example 23 | 0.32 | 0.324 | 0.317 | 46 | 683 |

The ceramic honeycomb structures of Examples 14–20, in which partition walls had nonuniform thickness, had thermal shock-resistant temperatures of 700° C. or higher. This level of the thermal shock-resistant temperature was higher than that of Examples 21–23, in which $T_{av}/(T_{max}-T_{min})>40$. The thermal shock-resistant temperature of 700° C. or higher is suitable for carriers for catalysts for cleaning exhaust gases from gasoline engines or filters for removing particulates from exhaust gases from diesel engines. Accordingly, the ceramic honeycomb structures are not substantially subjected to cracking and breakage due to thermal shock during operation.

EXAMPLES 24–27

Reference Examples 7–9

To form cordierite having the same main component chemical composition as in Example 1, a cordierite-forming starting material powder comprising kaolin powder, calcined kaolin powder, alumina powder, aluminum hydroxide powder, silica powder and talc powder was mixed with a binder, a lubricant and spherical resin powder as a pore-forming material in predetermined amounts. Water was added to the resultant mixture to provide a plasticizable molding batch.

In order that one pair of opposing corners among four corners of partition walls 3 encircling each cell had various radius of curvature as shown in Table 4, the radii of curvature of side surfaces of pins in an extrusion-molding orifice means were adjusted. Using this orifice means, each batch was extrusion-molded to obtain a honeycomb green body. The resultant green bodies were sintered at 1,400° C. to obtain cordierite ceramic honeycomb structures 1 of 257 mm in outer diameter and 304 mm in length shown in FIGS. 8–10. The partition walls of each ceramic honeycomb structure had an average thickness of 0.3 mm and a porosity of 60%, and the number of cells was 46.5/cm$^2$.

Each ceramic honeycomb structure was cut perpendicularly to its flow paths, and observed by a 100-times optical microscope to measure the radii of curvature of cell corners of the flow paths. To evaluate breakage resistance (cracking resistance) to thermal shock and mechanical shock in each ceramic honeycomb structure 1, the isostatic strength of each ceramic honeycomb structure 1 was measured by the following procedures according to the automobile standards (JASO) M505-87 by the Society of Automotive Engineers of Japan, Inc. A sample of each ceramic honeycomb structure 1 was prepared with 10-mm-thick aluminum plates attached to both end surfaces thereof and 2-mm-thick rubber sheets attached to an outer peripheral surface thereof. Each sample was charged into a pressure container, which was filled with water and pressurized to break the sample. The pressure at breakage was defined as isostatic strength. The results are shown in Table 4.

TABLE 4

| No. | Radius of Curvature (mm) | | Isostatic Strength (MPa) |
| --- | --- | --- | --- |
| | One Pair of Opposing Corners | Other Pair of Opposing Corners | |
| Example 24 | 0.06 | 0.02 | 2.8 |
| Example 25 | 0.05 | 0.01 | 2.6 |
| Example 26 | 0.04 | 0.01 | 2.5 |
| Example 27 | 0.05 | 0 | 2.4 |
| Reference Example 7 | 0.01 | 0.01 | 1.5 |
| Reference Example 8 | 0.05 | 0.05 | 1.7 |
| Reference Example 9 | 0 | 0 | 0.9 |

Because one pair of opposing corners were different from the other pair of opposing corners in a radius of curvature in the ceramic honeycomb filters of Examples 24–27, their isostatic strength was 2 MPa or more, which was satisfactory for practical purposes. In the ceramic honeycomb filters of Reference Examples 7–9, however, opposing corners on both pairs had close radii of curvature, so that their isostatic strength was as low as less than 2 MPa.

EXAMPLES 28–31

To form cordierite having the same main component chemical composition as in Example 1, a cordierite-forming starting material powder comprising kaolin powder, calcined kaolin powder, alumina powder, aluminum hydroxide powder, silica powder and talc powder was mixed with a binder, a lubricant and spherical resin powder as a pore-forming material in predetermined amounts. Water was added to the resultant mixture to prepare plasticizable molding batches. Each batch was extrusion-molded to a cylindrical honeycomb shape and dried.

The resultant cylindrical ceramic honeycomb green bodies of 143 mm in diameter and 152 mm in length were sintered at 1,350–1,440° C. to obtain cordierite ceramic honeycomb structures 1 having partition walls 3 as shown in FIGS. 1(a) and (b). Incidentally, the compositions of cordierite materials, molding conditions, sintering conditions, etc. were adjusted to produce the ceramic honeycomb structures 1 of Examples 28–31 with various pore characteristics and honeycomb partition wall structures.

The porosity and average pore diameter of each ceramic honeycomb structure 1 were measured according to a mercury penetration method using Autopore III9410 available from Micromeritics. It was observed by the naked eye on the SEM photograph of the ceramic honeycomb structure in an arbitrary transverse cross section, which was ground, whether or not there were pores having substantially circular cross sections among those having cross section areas of 1,000 μm$^2$ or more. The roundness of the pores having cross section areas of 1,000 μm$^2$ or more was determined by analyzing the data of SEM image by a commercially available image analysis software (Image-Pro Plus version 3.0 available from Media Cybernetics) as illustrated in FIG. 14.

With respect to a test piece cut out from each ceramic honeycomb structure, the A-axis compression strength was measured according to the standards M505-87, "Test Method of Ceramic Monolith Carriers for Exhaust-Gas-Cleaning Catalysts for Automobiles" determined by the Society of Automotive Engineers of Japan, Inc.

Figure 2A:
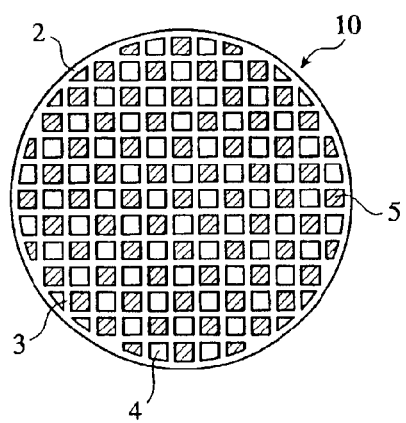
FIG. 2(a) is a front view showing one example of ceramic honeycomb filters.
Figure 2B:
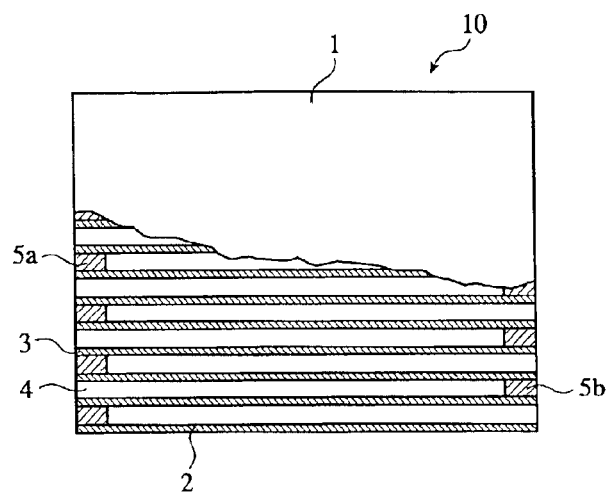
FIG. 2(b) is a partially cross-sectional side view showing the ceramic honeycomb filter of FIG. 2(a)
Figure 2C:
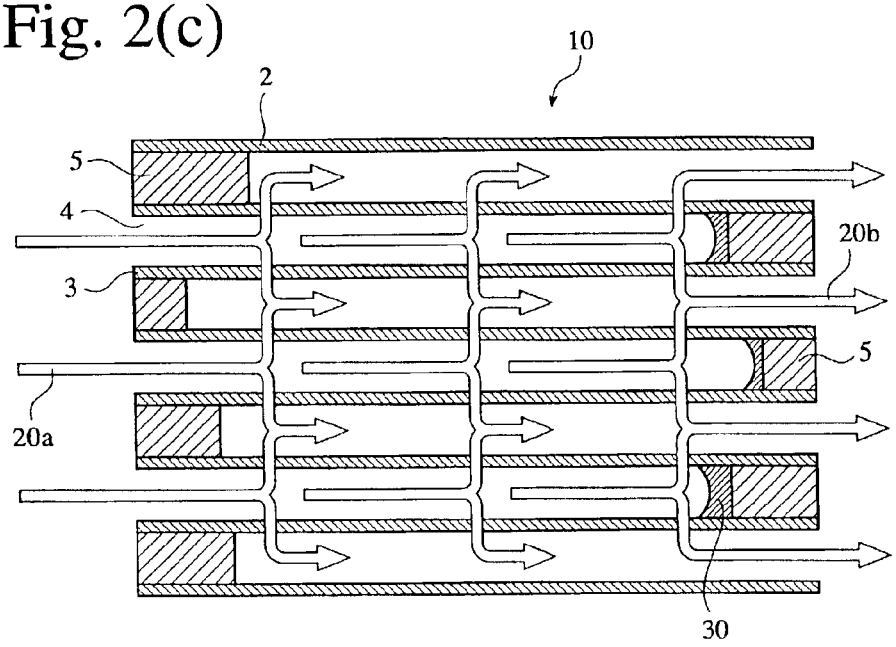
FIG. 2(c) is a schematic cross-sectional view showing the flow of an exhaust gas in the ceramic honeycomb filter of FIG. 2(b)
Figure 3:
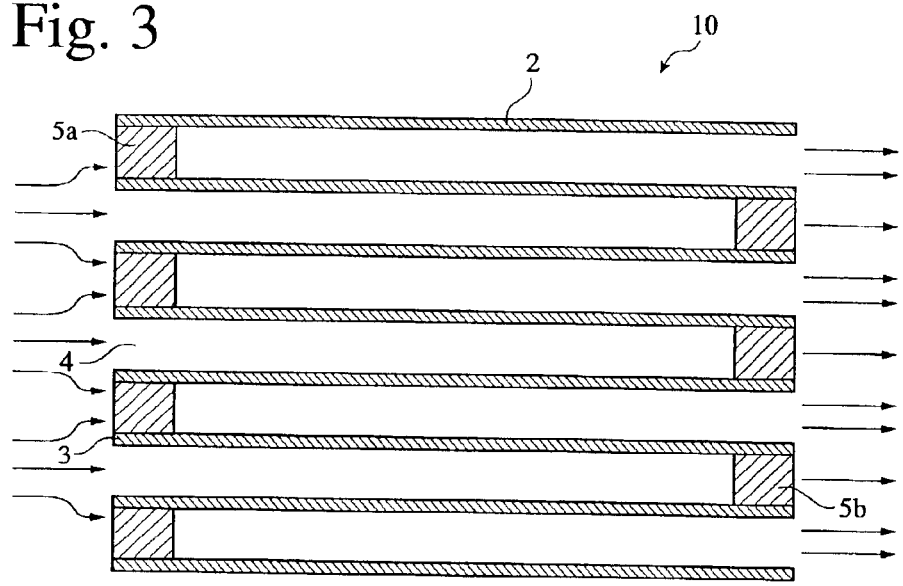
FIG. 3 is a cross-sectional view showing another example of the ceramic honeycomb filters according to the present invention.

The ends of each ceramic honeycomb structure were sealed as shown in FIGS. 2(a) and (b) to obtain a porous ceramic honeycomb filter. The filter characteristics (breakage resistance, pressure loss and capturing efficiency) of each porous ceramic honeycomb filter were evaluated as follows. The results are shown in Table 5.

(a) Breakage Resistance

The breakage resistance of each filter was evaluated by A-axis compression strength measured according to the standards M505-87, "Test Method of Ceramic Monolith Carriers for Exhaust-Gas-Cleaning Catalysts for Automobiles" determined by the Society of Automotive Engineers of Japan, Inc., by the following standards:

⊚: A-axis compression strength was 7 MPa or more (pass).

○: A-axis compression strength was 3 MPa or more and less than 7 MPa (pass).

×: A-axis compression strength was less than 3 MPa (fail).

(b) Pressure Loss

The pressure loss was measured at a pressure loss test stand with air at a flow rate of 7.5 Nm$^3$/minute flowing through each porous ceramic honeycomb filter, and evaluated by the following standards:

⊚: Pressure loss was 250 mmAq or less (pass).
○: Pressure loss was more than 250 mmAq and 300 mmAq or less (pass).
×: Pressure loss was more than 300 mmAq (fail).

(c) Carbon-capturing Efficiency

To determine the carbon-capturing efficiency, carbon having a particle size of 0.042 μm carried by air at a flow rate of 7.5 NM³/minute was caused to flow through each honeycomb filter for 2 hours in pressure loss test stand, such that the flow rate of carbon was 3 g/hour, and the amount of carbon captured by the honeycomb filter was measured. The evaluation standards of carbon-capturing efficiency were as follows:

○: The amount of carbon captured exceeded 90% of that introduced (pass).
×: The amount of carbon captured was less than 90% of that introduced (fail).

Reference Examples 10, 11

The same cordierite-forming starting material powder as in Example 1 was mixed with a flat pore-forming material having a large aspect ratio such as graphite powder, carbon black powder, etc. in a predetermined amount, to produce various cordierite ceramic honeycomb structures 1, which were measured with respect to pores characteristics, the structure and A-axis compression strength of partition walls and filter characteristics for overall evaluation, in the same manner as in Examples 28–31. The results are shown in Table 5.

Because pores having cross section areas of 1,000 μm² or more had ragged cross sections in the ceramic honeycomb filters of Reference Examples 10 and 11, it was impossible to measure their roundness. Also, because their A-axis compression strength was less than 3 MPa, any of their breakage resistance was "fail," resulting in the overall evaluation of "fail."

TABLE 5

| | | Pore Characteristics | | | Structure of Partition Walls | | A-Axis | Filter Characteristics | | | |
|---|---|---|---|---|---|---|---|---|---|---|---|
| No. | Porosity (%) | Average Pore Diameter (μm) | Pores with Substantially Circular Cross Section[1] | Pores Having Roundness of 1–10 (%)[2] | Thickness of Partition Walls (mm) | Interval of Partition Walls (mm) | Compression Strength (MPa) | Breakage Resistance | Pressure Loss | Carbon-Capturing Efficiency | Overall Evaluation |
| Example 28 | 62 | 13 | yes | 53 | 0.3 | 1.8 | 6.8 | ○ | ○ | ○ | ○ |
| Example 29 | 63 | 12 | yes | 83 | 0.3 | 1.8 | 10.3 | ⊚ | ○ | ○ | ⊚ |
| Example 30 | 56 | 12 | yes | 72 | 0.3 | 1.8 | 12.6 | ⊚ | ○ | ○ | ⊚ |
| Example 31 | 75 | 18 | yes | 73 | 0.3 | 1.8 | 5.3 | ○ | ⊚ | ○ | ⊚ |
| Reference Example 10 | 62 | 13 | no | Not Measurable | 0.3 | 1.8 | 2.6 | X | ○ | ○ | X |
| Reference Example 11 | 60 | 16 | no | Not Measurable | 0.3 | 1.8 | 1.8 | X | ○ | ○ | X |

Note
[1]The presence or absence of pores having cross section areas of 1,000 μm² or more with substantially circular cross sections.
[2]The percentage of the number of pores having roundness of 1–10 among pores having cross section areas of 1,000 μm² or more.

(d) Overall Evaluation

Based on the breakage resistance, the pressure loss and the carbon-capturing efficiency, overall evaluations were carried out according to the following standards:

⊚: Any of the breakage resistance, the pressure loss and the carbon-capturing efficiency was "pass," with one or more ⊚.
○: Any of the breakage resistance, the pressure loss and the carbon-capturing efficiency was "pass," without ⊚.
×: At least one of the breakage resistance, the pressure loss and the carbon-capturing efficiency was "fail."

Because the ceramic honeycomb filters of Examples 28–31 had partition walls, in which pores having cross section areas of 1,000 μm² or more included those having substantially circular cross sections, there were high percentages of pores having roundness of 1–10. Accordingly, any ceramic honeycomb filters had breakage resistance whose evaluation was "pass." They were also "pass" with respect to pressure loss and capturing efficiency, too, resulting in the overall evaluation of ○ or ⊚.

According to the overall evaluation based on the measurement results of the breakage resistance, the pressure loss and the particulates-capturing efficiency important for particulates-capturing filters, any of the ceramic honeycomb filters of Examples 28–31 was "pass."

EXAMPLES 32–45

Various ceramic honeycomb structures with pore characteristics and partition wall structures shown in Table 6 were produced in the same manner as in Examples 28–31 except for controlling the compositions of cordierite-forming starting material powders, the shape and size of extrusion molding orifice means, extrusion molding conditions and sintering conditions. Each ceramic honeycomb structure was measured with respect to porosity, an average pore diameter, the shape of pores having cross section areas of 1,000 μm² or more, the roundness of pores having cross section areas of 1,000 μm² or more, and A-axis compression strength in the same manner as in Examples 28–31. The results are shown in Table 6.

Each ceramic honeycomb structure was sealed at ends as shown in FIGS. 2(a) and (b), to obtain a porous ceramic honeycomb filter. The filter characteristics (breakage resistance, pressure loss and capturing efficiency) of each porous ceramic honeycomb filter were evaluated in the same manner as in Examples 28–31. The results are shown in Table 6.

Any of the ceramic honeycomb structures of Examples 32–45 had an A-axis compression strength of 3 MPa or more, and its breakage resistance was "pass." Among them, the ceramic honeycomb structures of Examples 34, 37, 40, 43 and 44 had extremely as high A-axis compression strength as more than 7 MPa. This is because of thick partition walls in Examples 34 and 43, a small porosity in Example 37, a small average pore diameter in Example 40, and a small pitch of partition walls in Example 44.

With respect to the pressure loss, any of the ceramic honeycomb structures of Examples 32–45 was "pass," and particularly the ceramic honeycomb structures of Examples 37, 41, 42 and 45 were excellent. This is because of a large porosity in Example 37, a large average pore diameter in Example 41, thin partition walls in Example 42, and a large pitch of partition walls in Example 45.

strength of less than 3 MPa, in Reference Examples 12 and 13. Accordingly, the ceramic honeycomb structures of Reference Examples 12 and 13 was "fail" in both breakage resistance and overall evaluation.

Because the ceramic honeycomb structure of Reference Example 14 had a porosity of more than 80%, its A-axis compression strength was as low as less than 3 MPa, despite the fact that the percentage of the number of pores having aspect ratios of 2 or more in transverse cross sections was 60% or more. Accordingly, Reference Example 14 was "fail" in breakage resistance and capturing efficiency.

TABLE 6

| No. | Pore Characteristics | | | Structure of Partition Walls | | A-axis compression strength (MPa) | Filter Characteristics | | | Overall Evaluation |
|---|---|---|---|---|---|---|---|---|---|---|
| | Porosity (%) | Average Pore Diameter ($\mu$m) | Pores with Aspect Ratios of 2 or Less (%)[3] | Thickness of Partition Walls (mm) | Interval of Partition Walls (mm) | | Breakage Resistance | Pressure Loss | Capturing Efficiency | |
| Example 32 | 64 | 11.5 | 79 | 0.3 | 1.8 | 6.2 | ○ | ○ | ○ | ○ |
| Example 33 | 65 | 14 | 82 | 0.3 | 1.8 | 6.9 | ○ | ○ | ○ | ○ |
| Example 34 | 65 | 14 | 82 | 0.43 | 2.5 | 10.3 | ⊙ | ○ | ○ | ⊙ |
| Example 35 | 65 | 14 | 82 | 0.2 | 1.5 | 6.8 | ○ | ○ | ○ | ○ |
| Example 36 | 56 | 12 | 72 | 0.3 | 1.8 | 12.6 | ⊙ | ○ | ○ | ⊙ |
| Example 37 | 75 | 18 | 74 | 0.3 | 1.8 | 5.3 | ○ | ⊙ | ○ | ○ |
| Example 38 | 60 | 37.5 | 71 | 0.3 | 1.8 | 6.4 | ○ | ○ | ○ | ○ |
| Example 39 | 65 | 16 | 62 | 0.3 | 1.8 | 6.8 | ○ | ○ | ○ | ○ |
| Example 40 | 57 | 8.6 | 71 | 0.3 | 1.8 | 11.6 | ⊙ | ○ | ○ | ⊙ |
| Example 41 | 62 | 42 | 63 | 0.3 | 1.8 | 3.3 | ○ | ⊙ | ○ | ○ |
| Example 42 | 65 | 14 | 82 | 0.1 | 1.8 | 3.1 | ○ | ⊙ | ○ | ○ |
| Example 43 | 65 | 14 | 82 | 0.5 | 1.8 | 16.5 | ⊙ | ○ | ○ | ⊙ |
| Example 44 | 65 | 14 | 82 | 0.3 | 1 | 9.8 | ⊙ | ○ | ○ | ⊙ |
| Example 45 | 65 | 14 | 82 | 0.3 | 3.8 | 3.2 | ○ | ⊙ | ○ | ○ |
| Reference Example 12 | 57 | 15 | 54 | 0.3 | 1.8 | 2.6 | X | ○ | ○ | X |
| Reference Example 13 | 60 | 16 | 32 | 0.3 | 1.8 | 1.8 | X | ○ | ○ | X |
| Reference Example 14 | 82 | 35 | 63 | 0.3 | 1.8 | 2.5 | X | ○ | X | X |

Note
[3]The percentage of the number of pores having aspect ratios of 2 or less in their transverse cross sections, among those having cross section areas of 1,000 $\mu$m$^2$ or more.

With respect to the capturing efficiency, all of the ceramic honeycomb structures of Examples 32–45 were "pass."

According to overall evaluations based on the measurement results of the breakage resistance, the capturing efficiency and the pressure loss important for particulates-capturing filters, any of the ceramic honeycomb structure filters of Examples 32–45 was "pass."

Reference Examples 12–14

Various ceramic honeycomb structures having pore characteristics and partition wall structures shown in Table 6 were produced to measure porosity, an average pore diameter, the shapes of pores having cross section areas of 1,000 $\mu$m$^2$ or more, the roundness of pores having cross section areas of 1,000 $\mu$m$^2$ or more, and A-axis compression strength, in the same manner as in Examples 28–31 except for adjusting the composition of the cordierite-forming starting material powder, the shape and size of an extrusion molding orifice means, extrusion molding conditions and sintering conditions. The results are shown in Table 6.

Less than 60% of pores having cross section areas of 1,000 $\mu$m$^2$ or more had aspect ratios of 2 or less in their transverse cross sections, with an A-axis compression As described above in detail, the ceramic honeycomb filter of the present invention has small pressure loss and excellent mechanical strength and thermal shock resistance free from cracking and melting due to thermal shock during its regeneration operation.

What is claimed is:

1. A ceramic honeycomb filter comprising a ceramic honeycomb structure having porous partition walls defining a plurality of flow paths for flowing an exhaust gas through said porous partition walls to remove particulates from said exhaust gas, wherein one end of each flow path is provided with a sealer, such that scalers of said flow paths are in an inlet and an outlet of said ceramic honeycomb structure in a desired pattern; wherein said partition walls have a thickness of 0.1–0.5 mm and a porosity of 50–80%; wherein the porosity of said sealers is larger than that of the partition walls; wherein the depth of said scalers is 3–15 mm, and
    wherein at least part of pores having cross section areas of 1,000 $\mu$m$^2$ or more in an arbitrary cross section of said partition walls have circular cross sections.

2. The ceramic honeycomb filter according to claim 1, wherein the percentage of the number of pores having roundness of 1–10 is 50% or more among pores having cross section areas of 1,000 $\mu m^2$ or more in an arbitrary cross section of said partition walls.

3. The ceramic honeycomb filter according to claim 1, wherein the percentage of the number of pores having aspect ratios of 2 or less is 60% or more among pores having cross section areas of 1,000 $\mu m^2$ or more in an arbitrary cross section of said partition walls.

4. The ceramic honeycomb filter according to claim 1, wherein said partition walls have a porosity of 60–70%.

5. The ceramic honeycomb filter according to claim 1, wherein an average pore diameter of pores of said partition walls is 10–40 $\mu m$.

6. The ceramic honeycomb filter according to claim 1, wherein the interval of said partition walls is 1–3.5 mm.

7. The ceramic honeycomb filter according to claim 1, having an A-axis compression strength of 3 MPa or more.

8. The ceramic honeycomb filter according to claim 1, wherein it is made of cordierite having a main component chemical composition comprising 42–56% by mass of $SiO_2$, 30–45% by mass of $Al_2O_3$, and 12–16% by mass of MgO.

9. A ceramic honeycomb filter comprising a ceramic honeycomb structure having porous partition walls defining a plurality of flow paths for flowing an exhaust gas through said porous partition walls to remove particulates from said exhaust gas, wherein one end of each flow path is provided with a sealer, such that scalers of said flow paths in an inlet and an outlet of said ceramic honeycomb structure are in a desired pattern, wherein said sealers have pores; and wherein at least part of said pores have substantially circular cross sections.

10. A ceramic honeycomb structure having porous partition walls defining a plurality of flow paths, wherein an arbitrary cross section of said partition walls forming said flow paths have nonuniform thickness, wherein the average thickness $T_{av}$, the maximum thickness $T_{max}$ and the minimum thickness $T_{min}$ of said partition walls satisfy the conditions of $T_{av}/(T_{max}-T_{min}) \leq 40$, and wherein a transverse cross section of each flow path is in a substantially square shape as a whole; wherein at least part of the transverse cross sections of flow paths is arcuate in one pair of opposing corners; and wherein said one pair of opposing corners is larger than the other pair of opposing corners in a radius of curvature in each flow path.

11. The ceramic honeycomb structure according to claim 10, wherein it is made of cordierite having a main component chemical composition comprising 42–56% by mass of $SiO_2$, 30–45% by mass of $Al_2O_3$, and 12–16% by mass of MgO.

12. A ceramic honeycomb structure having porous partition walls defining a plurality of flow paths, wherein a transverse cross section of each flow path is in a substantially square shape as a whole; wherein at least part of cross sections perpendicular to axial direction of flow paths is arcuate in one pair of opposing corners; and wherein said one pair of opposing corners is larger than the other pair of opposing corners in a radius of curvature in each flow path.

13. A ceramic honeycomb structure having porous partition walls defining a plurality of flow paths, wherein an arbitrary cross section of said partition walls forming said flow paths have nonuniform thickness, wherein it has a porosity of 50–80%; and wherein at least part of pores having cross section areas of 1,000 $\mu m^2$ or more in an arbitrary cross section of said partition walls have circular cross sections.

14. The ceramic honeycomb structure according to claim 13, wherein the percentage of the number of pores having roundness of 1–10 is 50% or more among pores having cross section areas of 1,000 $\mu m^2$ or more in an arbitrary cross section of said partition walls.

15. The ceramic honeycomb structure according to claim 13, wherein the percentage of the number of pores having aspect ratios of 2 or less is 60% or more among pores having cross section areas of 1,000 $\mu m^2$ or more in an arbitrary cross section of said partition walls.

16. The ceramic honeycomb structure according to claim 13, wherein said porosity is 60–70%.

17. The ceramic honeycomb structure according to claim 13, wherein an average pore diameter of said pores is 10–40 $\mu m$.

18. The ceramic honeycomb structure according to claim 13, wherein the thickness of said partition walls is 0.1–0.5 mm; and wherein the interval of said partition walls is 1–3.5 mm.

19. The ceramic honeycomb structure according to claim 13, having an A-axis compression strength of 3 MPa or more.

20. The ceramic honeycomb structure according to claim 13, wherein it is made of cordierite having a main component chemical composition comprising 42–56% by mass of $SiO_2$, 30–45% by mass of $Al_2O_3$, and 12–16% by mass of MgO.

* * * * *